United States Patent
Herrmann

(10) Patent No.: US 8,023,408 B2
(45) Date of Patent: Sep. 20, 2011

(54) DYNAMICALLY CHANGING MESSAGE PRIORITY OR MESSAGE SEQUENCE NUMBER

(75) Inventor: Christian Herrmann, Rangendingen (DE)

(73) Assignee: International Business Machines Corporation, Armonk, NY (US)

(*) Notice: Subject to any disclaimer, the term of this patent is extended or adjusted under 35 U.S.C. 154(b) by 1513 days.

(21) Appl. No.: 11/274,772

(22) Filed: Nov. 15, 2005

(65) Prior Publication Data

US 2006/0109857 A1 May 25, 2006

(30) Foreign Application Priority Data

Nov. 19, 2004 (EP) .................................. 04105919

(51) Int. Cl.
*H04L 12/26* (2006.01)
*H04L 12/56* (2006.01)
*G08C 15/00* (2006.01)

(52) U.S. Cl. ......... 370/229; 370/230; 370/235; 370/412

(58) Field of Classification Search .................. 370/412, 370/428, 429, 389; 719/314
See application file for complete search history.

(56) References Cited

U.S. PATENT DOCUMENTS

| | | | | |
|---|---|---|---|---|
| 4,630,261 A * | 12/1986 | Irvin | ................. | 370/235 |
| 5,115,392 A * | 5/1992 | Takamoto et al. | .......... | 718/101 |
| 5,327,526 A | 7/1994 | Nomura et al. | | |
| 5,327,558 A * | 7/1994 | Burke et al. | ................. | 710/8 |
| 5,517,324 A * | 5/1996 | Fite et al. | ................. | 358/434 |
| 5,588,009 A * | 12/1996 | Will | ..................... | 714/749 |
| 5,600,312 A * | 2/1997 | Willard et al. | ............. | 340/7.27 |
| 5,767,849 A * | 6/1998 | Borgendale et al. | .......... | 715/745 |
| 5,991,824 A * | 11/1999 | Strand et al. | ................ | 710/1 |
| 6,021,333 A * | 2/2000 | Anderson et al. | ........... | 455/560 |
| 6,055,564 A | 4/2000 | Phaal | | |
| 6,147,977 A * | 11/2000 | Thro et al. | ................... | 370/265 |
| 6,157,401 A * | 12/2000 | Wiryaman | ............... | 348/14.09 |
| 6,164,920 A * | 12/2000 | Nazarian et al. | ............ | 417/4 |
| 6,222,841 B1 * | 4/2001 | Taniguchi | ................... | 370/389 |
| 6,570,876 B1 * | 5/2003 | Aimoto | ....................... | 370/389 |
| 6,658,485 B1 * | 12/2003 | Baber et al. | ................. | 719/314 |
| 6,816,494 B1 * | 11/2004 | Raza | ....................... | 370/395.41 |
| 6,965,577 B1 * | 11/2005 | Murphy | ....................... | 370/255 |
| 7,010,611 B1 * | 3/2006 | Wiryaman et al. | ............ | 709/232 |
| 7,215,652 B1 * | 5/2007 | Foley et al. | ................... | 370/319 |

(Continued)

OTHER PUBLICATIONS

"U.S. Appl. No. 12/240,190 Office Action", Jun. 16, 2010, 10 pages.

(Continued)

*Primary Examiner* — Marsha D Banks Harold
*Assistant Examiner* — Christopher T Wyllie
(74) *Attorney, Agent, or Firm* — DeLizio Gilliam, PLLC

(57) ABSTRACT

A message sequence regulator (MSR) system includes a message parser, a message extraction repository, a rules repository, a message definition repository, an interface to a resource monitor for monitoring system resources by single resource monitoring agents, and a notification component for identifying sequence regulation operations which cannot be executed. The MSR system receives copies of messages loaded into or retrieved from queues by a queue manager as well as event messages from the resource monitor. The message extracts parts of the message using message structures defined in the rules repository and stores the extracted parts in the message extraction repository. If a defined condition is found to exist, the MSR system initiates calculation of an appropriate message sequence number or message priority level. The queue manager updates the message record without removing the message from the queue.

9 Claims, 11 Drawing Sheets

U.S. PATENT DOCUMENTS

| | | | |
|---|---|---|---|
| 7,447,777 B1* | 11/2008 | Singh Ahuja et al. | 709/227 |
| 7,577,145 B2* | 8/2009 | Maruyama et al. | 370/392 |
| 7,710,871 B2* | 5/2010 | Lavian et al. | 370/230 |
| 7,721,294 B2* | 5/2010 | Quinet et al. | 719/315 |
| 2002/0136228 A1* | 9/2002 | Miyamoto | 370/411 |
| 2002/0141449 A1* | 10/2002 | Johnson | 370/473 |
| 2003/0091042 A1* | 5/2003 | Lor | 370/389 |
| 2003/0097436 A1* | 5/2003 | Clow et al. | 709/223 |
| 2003/0214949 A1* | 11/2003 | Shaikli | 370/394 |
| 2004/0032869 A1* | 2/2004 | Ambe et al. | 370/392 |
| 2004/0179523 A1* | 9/2004 | Maruyama et al. | 370/389 |
| 2005/0022207 A1* | 1/2005 | Grabarnik et al. | 719/313 |
| 2005/0050353 A1* | 3/2005 | Thiele et al. | 713/201 |
| 2005/0060295 A1* | 3/2005 | Gould et al. | 707/3 |
| 2005/0163138 A1* | 7/2005 | Kanazawa | 370/412 |
| 2005/0198110 A1* | 9/2005 | Garms et al. | 709/202 |
| 2005/0228863 A1* | 10/2005 | Palmeri et al. | 709/205 |
| 2006/0007935 A1* | 1/2006 | Bennett et al. | 370/395.5 |
| 2006/0109857 A1* | 5/2006 | Herrmann | 370/412 |
| 2007/0276958 A1* | 11/2007 | Curtis et al. | 709/238 |
| 2009/0077205 A1* | 3/2009 | Quinet et al. | 709/219 |
| 2010/0082855 A1 | 4/2010 | Accapadi et al. | |

OTHER PUBLICATIONS

"U.S. Appl. No. 12/240,190 Final Office Action", Nov. 3, 2010, 12 pages.

* cited by examiner

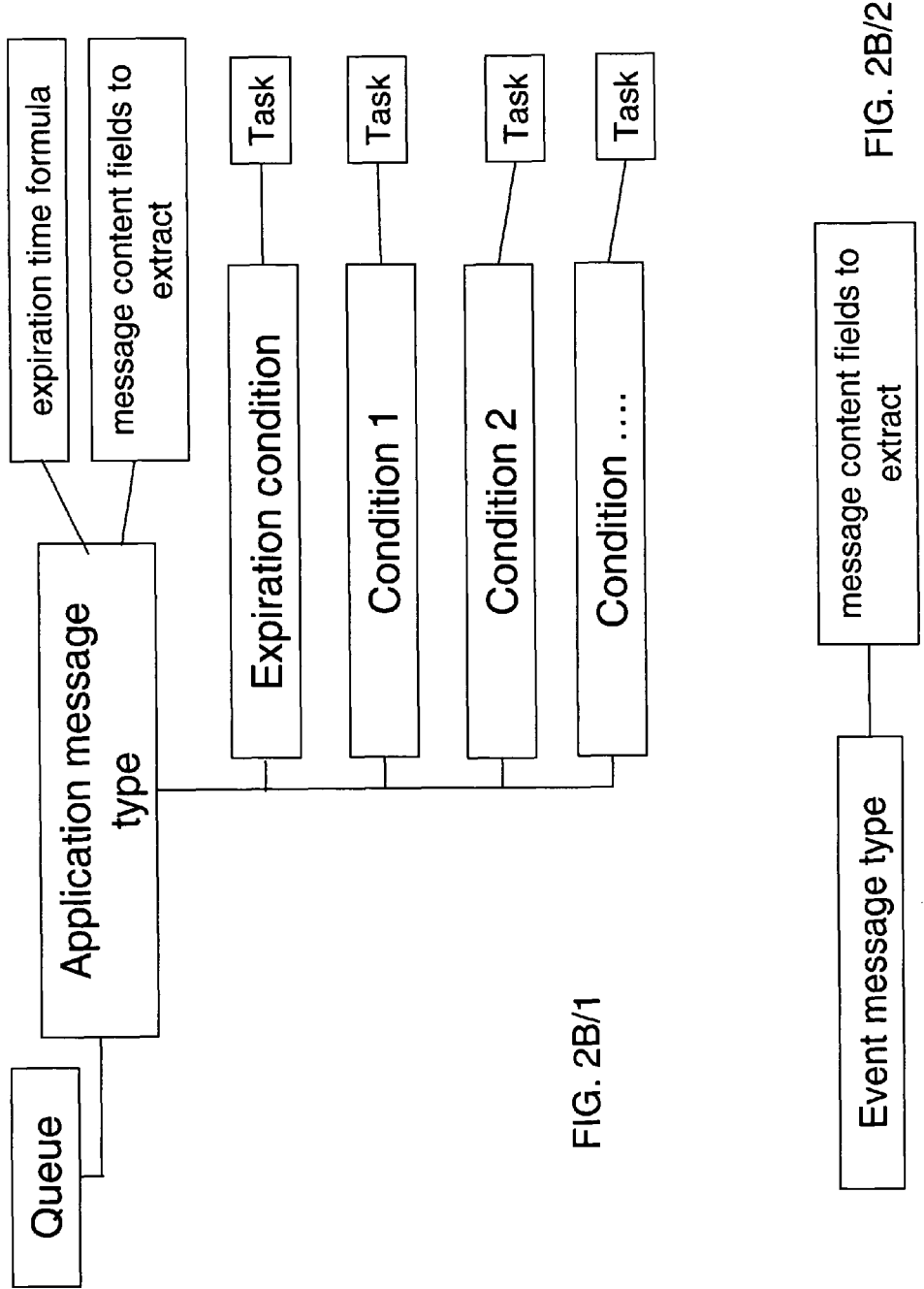
FIG. 2B/1
FIG. 2B/2

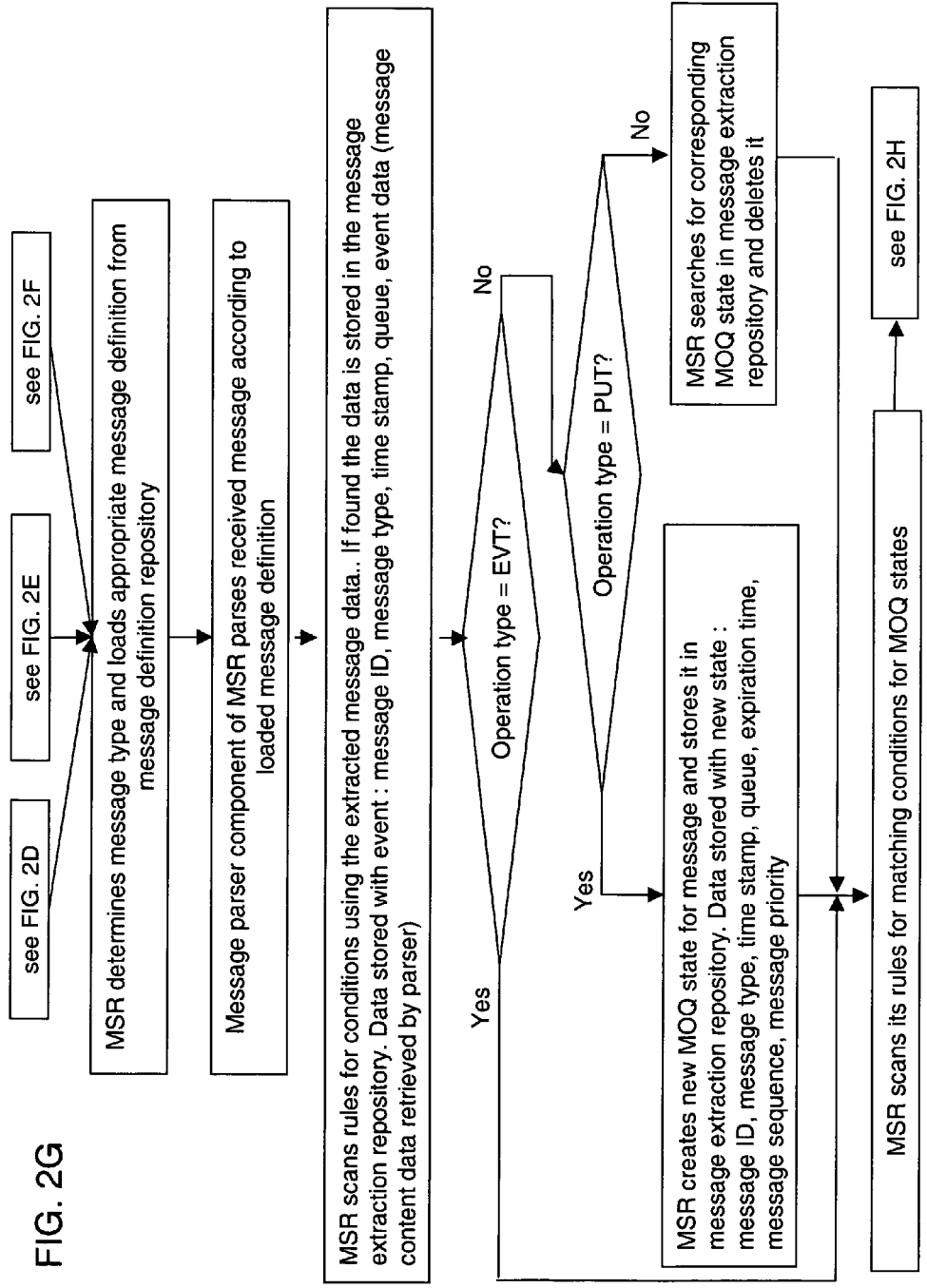

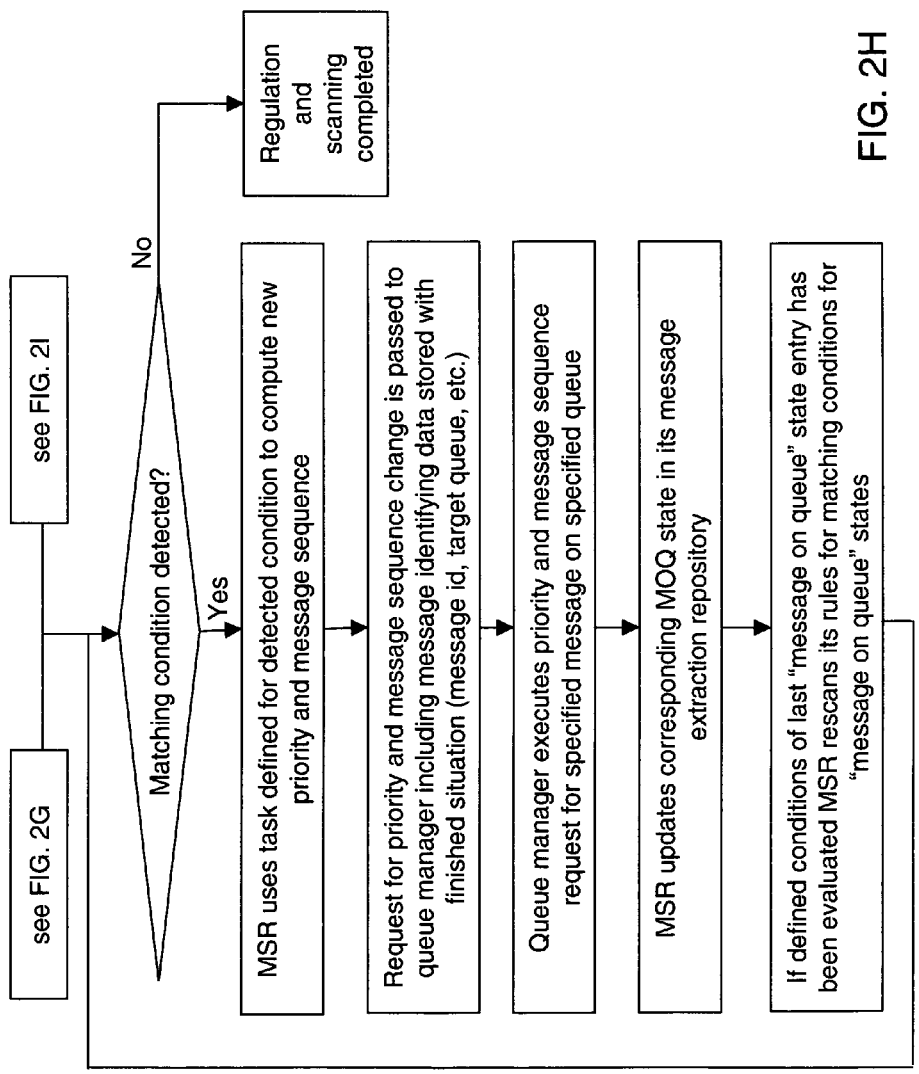

DYNAMICALLY CHANGING MESSAGE PRIORITY OR MESSAGE SEQUENCE NUMBER

CROSS-REFERENCE TO RELATED APPLICATIONS

This application claims the benefit of European Patent Office Application No. 04105919.7, filed Nov. 19, 2004, assigned to the assignee of the present application, and incorporated herein by reference.

FIELD OF THE INVENTION

The present invention relates to message queuing in an asynchronous messaging network, and in particular to a system, method and computer program product for dynamically changing message priority or message sequence number in a message queuing system based on processing conditions.

It is increasingly common to distribute a data processing operation over a plurality of data processing units, with each of the units communicating over a data communications network (e.g. the Internet). One reason for this is that a particular data processing unit may be able to do a job better than another, so a first unit makes a request for a second unit to do a particular job and then to return the result back to the first unit.

It is also very common having a large number of intermediate data processing units (also known as "nodes") in between the originating unit that makes a request and the destination unit that is being requested to do the work. Each intermediate unit receives the request, performs some initial processing to determine what to do with it, and then forwards it on to the next unit.

BACKGROUND OF THE INVENTION

A popular mechanism for carrying out such distributed data processing is called asynchronous message queuing, where applications communicate with each other by sending messages to queues, which can then be accessed by the receiving application at a time that is convenient for that receiving application. IBM's WebSphere MQ software product, which has been on the market for a number of years, is a popular example of this type of software.

More and more companies are providing services based on message queuing systems as underlying information transportation infrastructure. The order in which messages are processed on a queue can be either first-in-first-out (FIFO) or priority based. The priority of a message is stored in the message descriptor of the message and is set by the application putting the message in the queue. Many messages in different business contexts are processed through the message queuing system. The number and the size of the messages can vary over huge ranges and is normally unpredictable as are the consequences of this variation. This implies that a specific priority is valid for a message when it is put in a queue but may become invalid while the message remains in the queue waiting for further processing. Furthermore, some applications may not know the correct priority of the message when putting it in the queue.

The problem in a message queuing system is that the priority of a message is static as long as the message stays in a queue. It is not possible to dynamically adjust the priority of a message already stored in a queue according to deal with the effects of changes in system workload, changes in business processes, changes in the environment, or any other changes in the systems and/or resources required for the processing of the message. Changes may include easy-to-detect situations like a broken network connection or an outage of a process on the system, but may also include a complex construct of several events on different systems in combination with the content of the message. An example for this would be payment messages for different banks with different amounts processed in a payment hub. A condition would be to process a message until a specific time of the day. If the processing throughput of the participating systems decreases in a way that this condition would not be fulfilled (either because some resources fail or because the system usage increases unexpectedly), the system automatically has to detect this and to change the sequence of the messages on that queue so that the specific message is processed before the stated deadline. Changing the message priority does not necessarily mean increasing it but may also mean decreasing it.

Known message queuing systems do not provide any functionality for changing message priority according to the environmental and processing conditions and/or message content once the message is stored in a queue.

SUMMARY OF THE INVENTION

The present invention provides a system, method and a computer program product for dynamically changing message sequence number, especially message priority, in a queue based on processing conditions by introducing a MSR system component in each message queuing system.

The MSR system component comprises a MSR system including a message parser, a message extraction repository, a rules repository, a message definition repository, an interface to a resource monitor for monitoring system resources by single resource monitoring agents, and a notification component for identifying sequence regulation operations which cannot be executed.

The MSR system receives copies of messages stored queues or, more specifically, messages retrieved from queues by a queue manager as well as event messages from the resource monitor. The message parser in the MSR system extracts parts of the message of all message types (event messages from resource monitor or application messages) as defined in the rules repository and stores them in the message extraction repository.

During each message operation in the message queuing system and on receipt of each event message from the resource monitor, the MSR system evaluates conditions defined in the rules repository by using information in the message extraction repository and initiates a message sequence or message priority evaluation on each matching condition applicable to the queued message without moving the message from the queue.

BRIEF DESCRIPTION OF THE DRAWINGS

The above, as well as additional objectives, features and advantages of the present invention will be apparent in the following detailed written description. The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

FIGS. 2B1 and 2B2 show the structure of rules in a rules repository. FIG. 2B1 shows the structure of a rule for an application message while FIG. 2B2 shows the structure of a rule for an event message;

FIG. 2G shows more operations performed by the message sequence regulation system;

FIG. 2H shows the flow of operations performed by the message sequence regulator system.

DETAILED DESCRIPTION

Figure 1A:
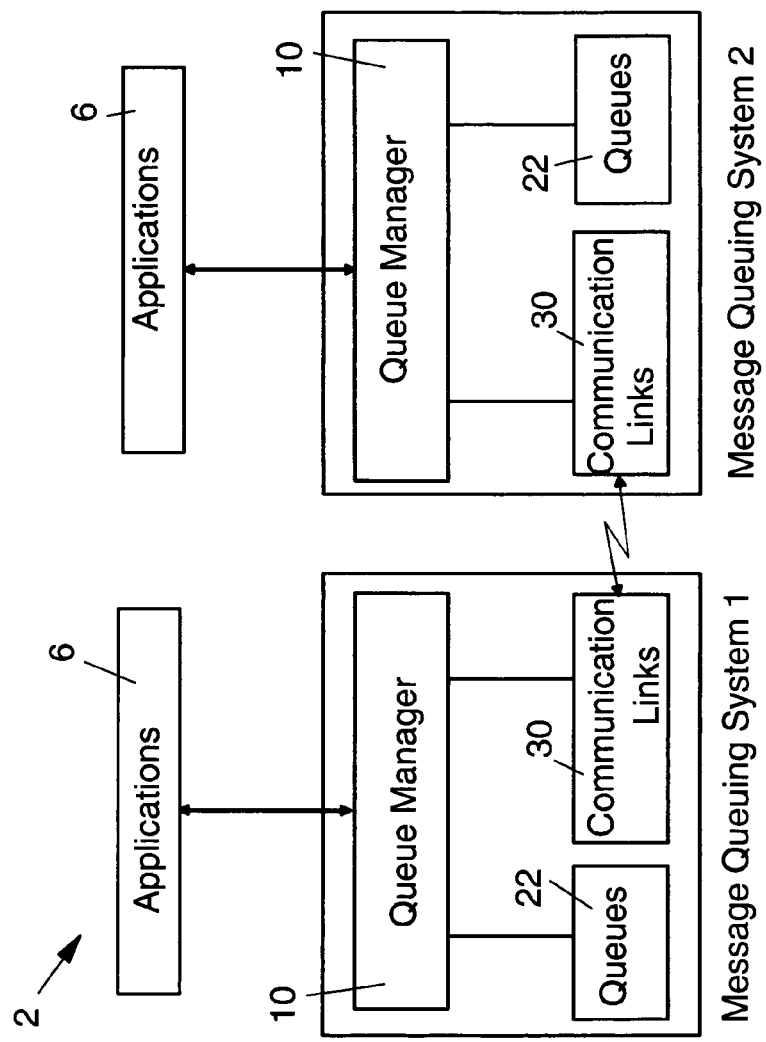
FIG. 1A shows a prior art message queuing system.

FIG. 1A shows two prior art message queuing systems within a messaging network 2. An application 6 generates messages and sends them to one of the message queuing systems. Each message queuing system includes at least a queue manager 10, queues 22, and communication links 30 to other message queuing systems. A queue 22 is a data structure used to store messages until they are retrieved by an application. Queues 22 are managed by the queue manager 10. The queue manager 10 is responsible for maintaining the queues 22 it owns, for storing all the messages it receives from application programs or other queue managers in the appropriate queues, and for retrieving the messages in response to application requests.

Queues 22 exist independently of the applications that use them. A queue can exist in main storage if it is temporary, on disk or similar auxiliary storage if it must be kept in case of recovery, or in both places if it is currently being used and must also be kept for recovery.

A message queuing system therefore is a system for asynchronous, assured exchange of information in form of messages between applications connected to the system. Each message includes a message descriptor that is known to and interpretable by the message queuing system as well as a message body the layout is variable and application dependent. A message queuing system stores and transports messages without knowing or being able to process the message content in the message body.

Figure 1B:
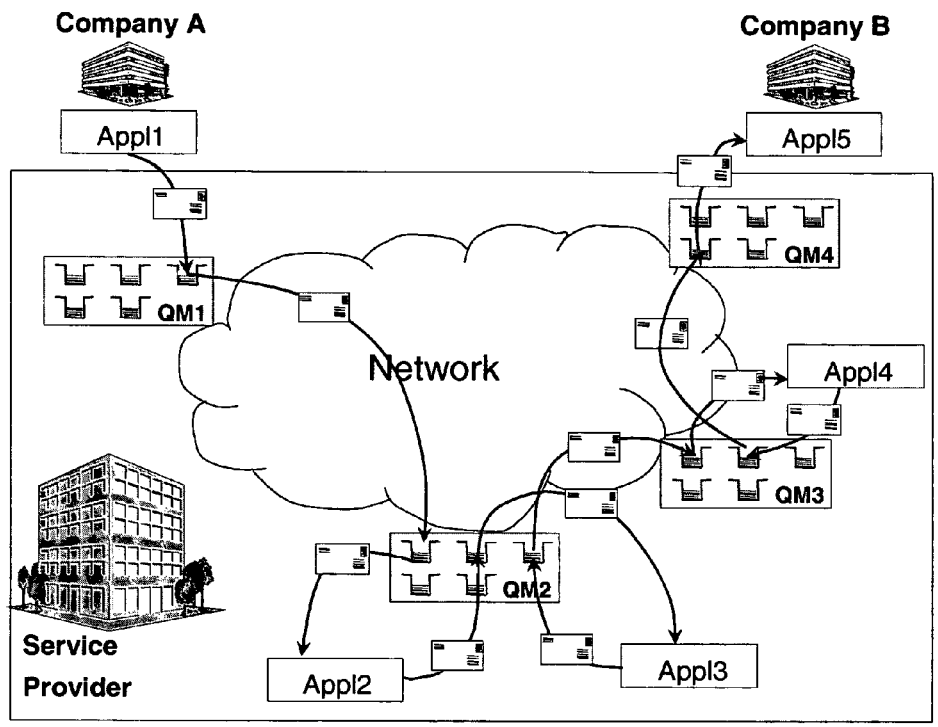
FIG. 1B shows a typical scenario of message flows.

Multiple message queuing systems can be interconnected in a message queuing network 2 which allows applications on different platforms and in different physical locations to easily exchange data without knowledge of the underlying infrastructure. FIG. 1B is an illustration of a simple network maintained by a service provider for enabling two different companies, Company A and Company B, generated by or needed by their own application programs. The service provider preferably provides necessary infrastructure including message queuing systems and application programs for controlling those systems.

Figure 1C:
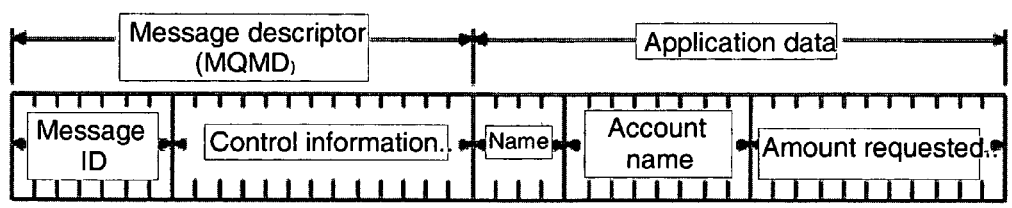
FIG. 1C shows the structure of a message used by a known message queuing system.

FIG. 1C shows the structure of a prior art message in more detail. As already noted, every message consists of a message descriptor and a message body.

The message descriptor identifies the message (message ID) and contains additional control information such as the type of the message and the priority assigned to the message by the sending application.

The message body includes application data, the content and structure of which is defined by the application program using the data.

Figure 2A:
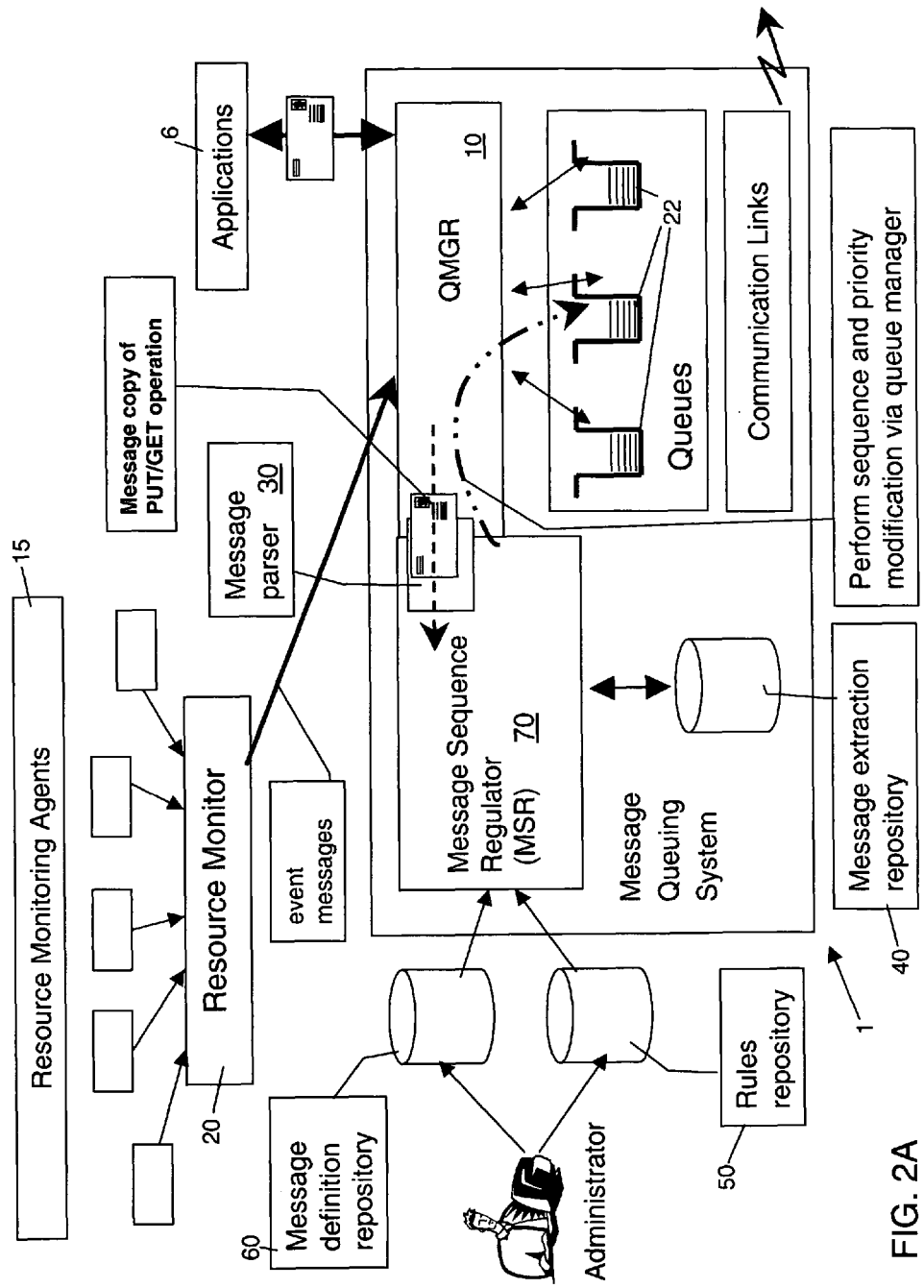
FIG. 2A shows the inventive message sequence regulation system integrated in a message queuing system.

FIG. 2A shows the message sequence regulation system integrated into a message queuing system.

The queue manager 10 forms the interface to the applications 6, handling their requests for operations on messages stored in the queues 22 of the message queuing system 1.

For implementing the present invention, the message queuing system 1 is extended by a new system component, MSR system (MSR) 70. The MSR has an interface to a resource monitor 20 for monitoring system resources by dedicated resource monitoring agents 15. Each resource monitoring agent monitors a particular resource involved in the message processing within message queuing network. For example a resource can be an application, a network controller, an I/O device, a CPU, etc. Each resource monitoring agent provides information about the state of its resource in form of an event message delivered to the resource monitor 20 using either a proprietary protocol or a standard protocol such as HTTP or SOAP. The resource monitor 20, in turn, provides the event message via a specific interface to the message queuing system 1. The event message is finally processed by the MSR 70 with or without the prior involvement of the queue manager 10.

The application messages processed by the queue manager 10 as a consequence of a message Get or Put request from the application 6 or another message queuing system, are loaded into or retrieved from one of the queues 22. Additionally, a copy of each processed message is provided to the MSR 70. MSR 70 also receives information about the type of the applied operation and the message sequence number generated by the queue manager on a message Put operation. The generation of sequence information can be accomplished for example, in a first-in-first-out implementation, by providing information about the position of the message in the queue, or, in a priority based implementation, by providing information about the position of the message within a given priority level.

The message parser 30, preferably part of the MSR 70, extracts information from application messages as well as from event messages received from the resource monitor 20.

The messages, especially the message descriptor and message body content, are processed by extracting their content. This is accomplished by first determining the message type. Then, based on the message type, the assigned message format or definition stored in the message definition repository 60 is retrieved and the message content is extracted according to the message definition.

Message definitions define the structure of the message body as a function of the message type. Examples of different message types include payment messages, event messages, application command messages, application response message, etc. Different portions of the message body usually represent different things; e.g. characters 1 to 10 may represent the name of the receiver, characters 11 to 14 may represent an integer that is interpreted as a payment amount, etc.

A further implementation of message definitions is a representation in the form of XML.

Extracted message content as defined in the rules for the specific message type is stored in the message extraction repository 40. Examples of extracted content include message ID, message type, timestamp and queue name.

The rules are retrieved from the rules repository 50. One rule is defined in the rules repository 50 for each queue 22 and each message type. The rule describes which part of the extracted message content is to be stored in the message extraction repository 40. Additionally, a rule defines one or more conditions when a message sequence number or priority change has to be performed. Each condition has an assigned task which describes how to set a new sequence or priority. This task consists of a more or less complex mathematical formula for computing the new priority and/or message sequence number and may also comprise extracted message data of any other message in the message queuing system.

Furthermore, each rule defines a formula for computing the expiration time of the "message in queue" state (MOQ). The "message in queue" state is generated by the MSR 70 when a message I loaded into a queue 22 by the queue manager 10 or, in other words, when the MSR 70 receives a message with the operation type Put from the queue manager 10. The received message preferably contains a unique message identifier, the queue name into which the message is put, a timestamp indicating when the message was loaded into the queue, an expiration time for the "message in queue" state computed by using the formula defined with the used rule, the message sequence and message priority. This message is stored in the message extraction repository 40. The extracted parts of the message content can be accessed by using the combination of message ID, message type, timestamp and queue name as a compound key to the table with the extracted message content. On each message Get operation the corresponding "message in queue" state is removed.

The task assigned to a certain condition defines how to calculate the new priority or new sequence. The task is executed when the assigned condition is fulfilled. Input for the condition can be any data stored in the message extraction repository 40 as well as system-wide data, e.g. time frame between two Put operations for the queue, time frame between two Get operation for the queue, or number of messages in the queue. The task output is either a new priority or a new message sequence number or both. If only a new priority is computed by the task the resulting message sequence number is calculated by the MSR 70. If only the message sequence number is calculated by the task, it is possible a new priority will be computed by the MSR 70 (e.g. the new sequence number results in a movement of the message to another priority group Based on a new priority value, a new expiration time is calculated by using the expiration time formula defined by the applicable rule. In a preferred embodiment, the formula will normally calculate a new expiration time that is equal to or lower than the currently calculated time at which the message is expected to be processed. The new priority or message sequence number values, including any newly calculated expiration time, is used to update the message extraction repository.

The MSR 70 provides the new priority and message sequence number to the appropriate queue manager which modifies the affected message in the specified queue and returns the result to the MSR 70.

In a preferred embodiment of the present invention, the MSR 70 additionally contains a notification component. The notification component is used to generate notification messages for triggering systems outside the message queuing system, e.g. a system console or resource monitor. The notification component is either initiated as a result of a task triggered by a matching condition or by the MSR in the case of dead-lock situations.

FIGS. 2B1 and 2B2 show the structure of rules in the rules repository.

FIG. 2B1 shows the structure of a rule for an application message type. Each queue may have a rule for each message type. A rule consists of at least the expiration condition and an assigned task for computing a new priority and/or message sequence number, an expiration time formula for calculating the expiration time of the "message in queue" state and a set of fields to be extracted from the message.

FIG. 2B2 shows the structure of a rule for an event message from the resource monitor. Event messages are only used as input for the MSR and therefore the rules for event message types only specify which parts of the extracted message content have to be stored in the message extraction repository 40. They are only used by the message parser component 30.

Figure 2C:
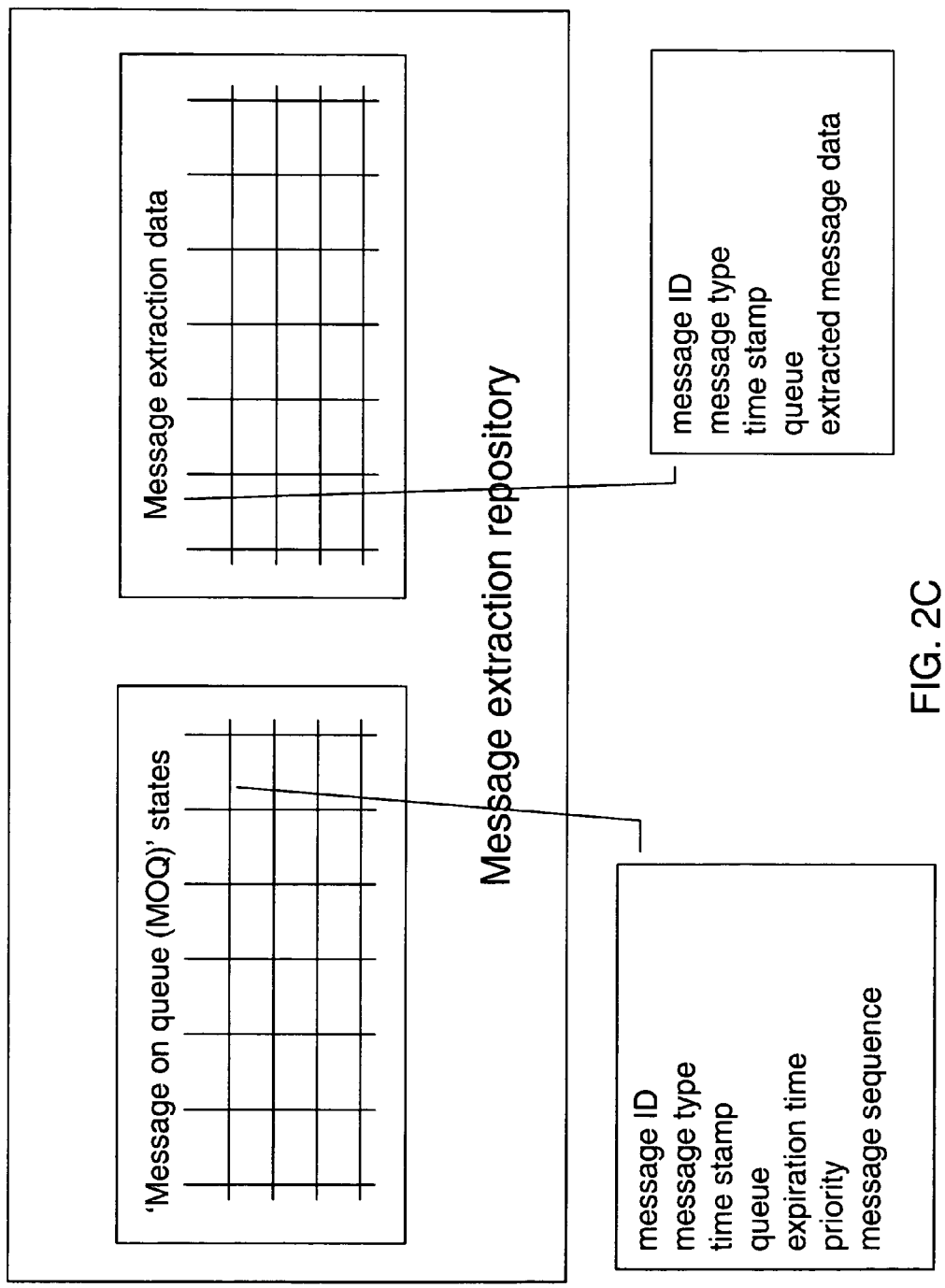
FIG. 2C shows the structure of a message extraction repository.

FIG. 2C shows the structure of the message extraction repository 40. The repository 40 consists of two tables, one for the extracted parts of the message content and one for the "message in queue" states. The extracted parts of the messages are stored with the message ID, the message type, the timestamp and the queue name as compound key used by the "message in queue" states to access the belonging extracted message content. The "message in queue" state consists of the message ID, message type, timestamp, queue name, expiration time computed when the state entry is generated, the priority and the message sequence number.

Figure 2D:
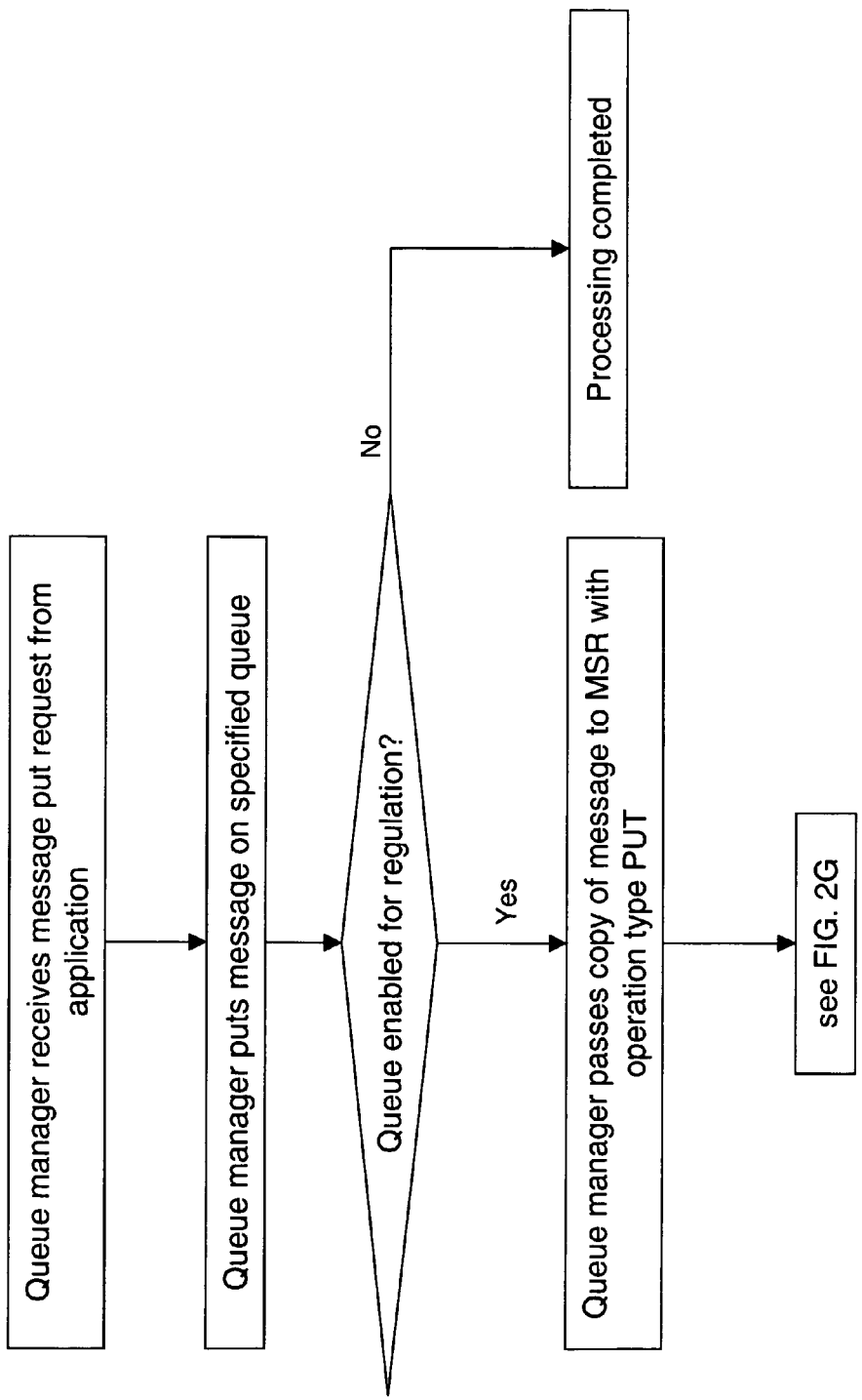
FIG. 2D shows the processing flow when an application message is stored in a queue and process steps executed by the queue manager before a copy of the application message is passed to the message regulation system.

FIG. 2D shows the processing flow when an application message is put into a queue and the process steps that are executed by the queue manager. The queue manager receives a message Put request from an application and loads the message provided with the request into the queue identified in the request. If the identified queue is enabled for priority and message sequence regulation, the queue manager passes a copy of the message to the MSR system, including the operation type PUT.

Figure 2E:
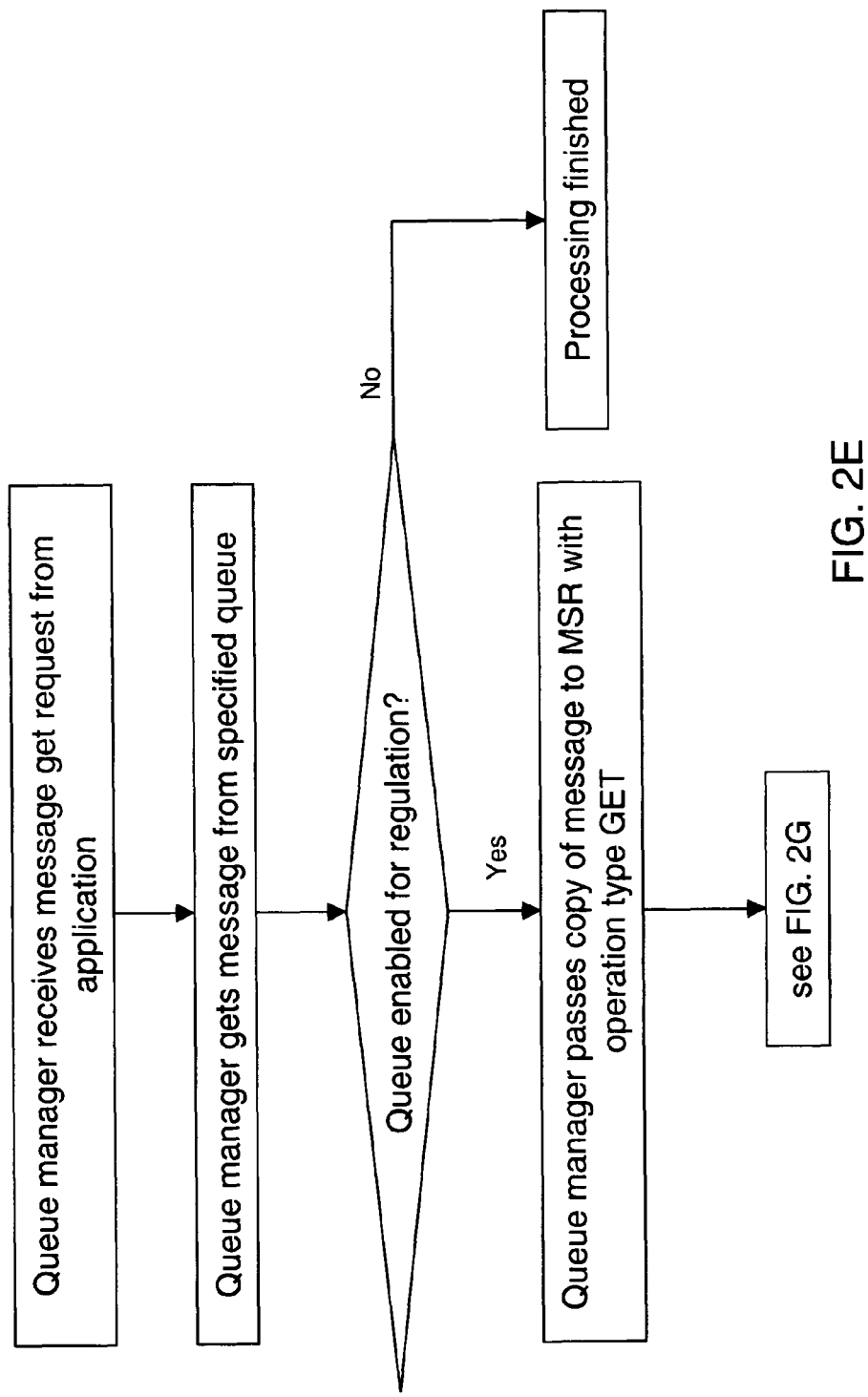
FIG. 2E shows the processing flow when an application message is retrieved from a queue and the process steps executed by the queue manager before a copy of the application message is passed to the message regulation system.

FIG. 2E shows the processing flow when an application message is retrieved from a queue and the process steps that are executed by the queue manager. The queue manager receives a message Get request from an application and retrieves the message identified in the request from the specified queue. If the queue identified in the Get request is enabled for priority and message sequence regulation, the queue manager passes a copy of the message, including the operation type GET, to the MSR system.

Figure 2F:
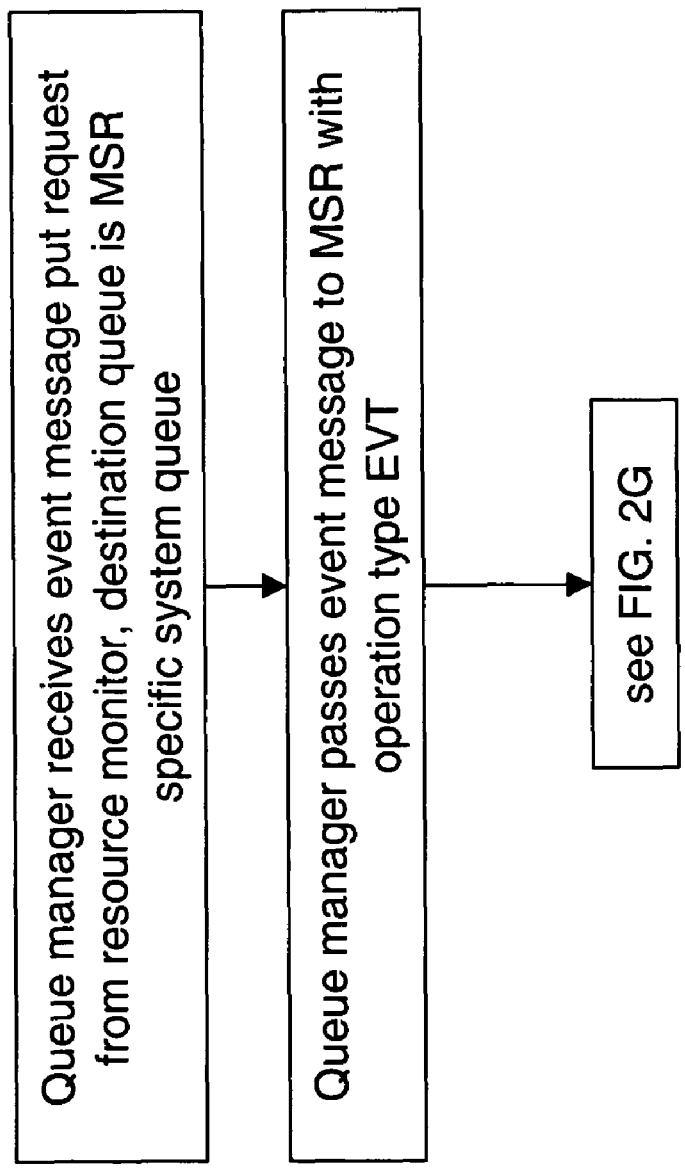
FIG. 2F shows the processing flow when an event message is received by the interface to resource monitor.

FIG. 2F shows an example of the processing flow when an event message is received by the interface to the resource monitor. In this example the interface is represented by the queue manager. The interface receives a message Put request from the resource monitor and passes the event message provided with the request, including the operation type EVT, to the MSR system.

FIG. 2G shows operations performed by the MSR system in the case of process flows already described with reference to FIGS. 2D-2F. A message received from the queue manager is passed to the message parser component. The message parser determines the message type of the message and loads the appropriate message definition from the message definition repository. Using the loaded message definition, the message parser extracts the message content from the received message. Then, the MSR component scans the conditions defined by rules stored in the rules repository if parts of the extracted message content of the received message are used by one of the conditions or tasks. If parts of the extracted message are used, the extracted message content is stored in the message extraction repository with the message ID, message type, timestamp and queue. If the operation type is Put, the MSR creates a new "message in queue" state entry in the message extraction repository. A "message in queue" state entry consists at least of the message ID, message type, timestamp, queue name, expiration time, priority and message sequence number. The expiration time is computed by using the expiration time formula defined by the rule for the message type of the received message.

If the operation type is Get, the MSR system searches for the corresponding "message in queue" state entry in the message extraction repository and removes that entry from the repository. Finally, the MSR system scans all conditions defined in the rules repository if one or more conditions are matched.

FIG. 2H shows additional processing flow of the MSR system. If the MSR system detects a matching condition in its scan of the "message in queue" states, it executes the task associated with the matching condition. The task calculates either a new message priority or message sequence number or both. A request with the new data is then passed by the MSR system to the queue manager for execution. The request preferably includes message-identifying data such as message ID and queue name. The queue manager executes the request and returns the result to the MSR system. Concurrently, the MSR calculates a new expiration and updates the related entry in the message extraction repository. After the defined conditions for the last "message in queue" state entry in the message extraction repository have been evaluated, the MSR system rescans the conditions until no more matching conditions are detected.

Figure 2I:
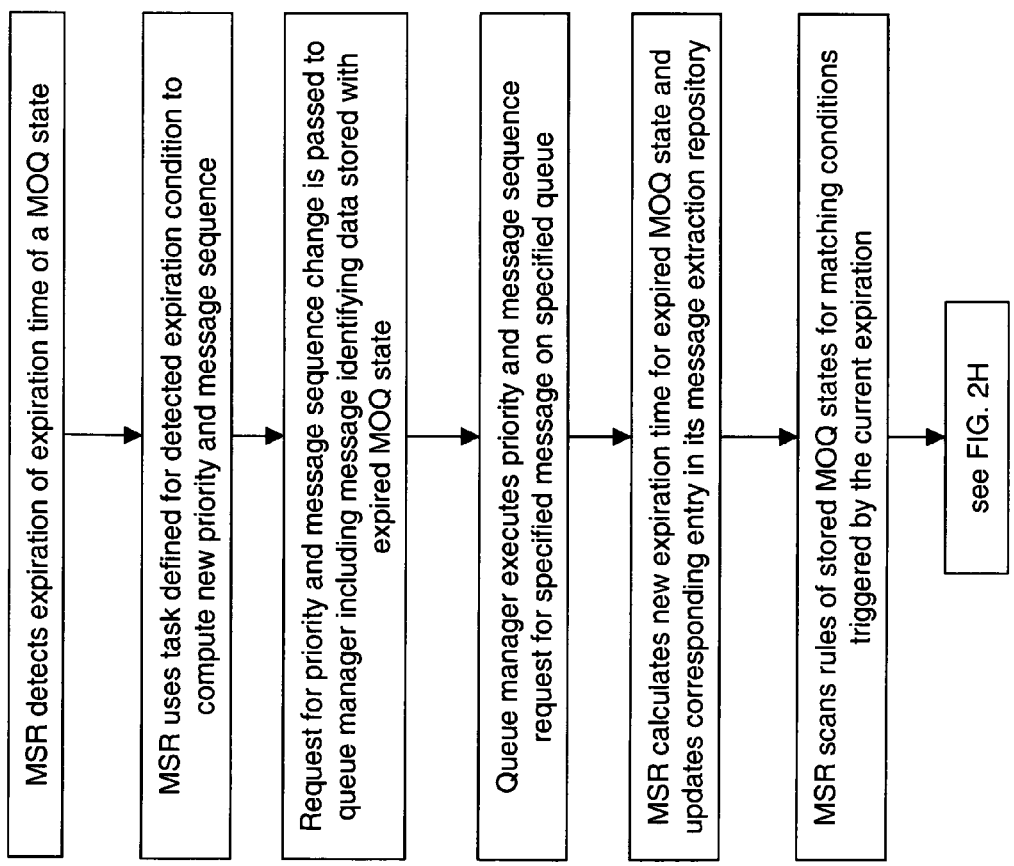
FIG. 2I shows the processing flow of the message sequence regulation system once a calculated expiration time of a "message in queue" state expires.

FIG. 2I shows steps performed by the MSR system when the calculated expiration time of a "message in queue" state has expired. If the MSR detects the expiration of the expiration time of a "message on queue" state in the message extraction repository, the MSR calculates a new priority and message sequence number. A request with the new data is then passed by the MSR system to the queue manager for execution. Message-identifying data like message ID and queue name are provided with the request. The queue manager executes the request and returns the result to the MSR system. Concurrently the MSR calculates a new expiration time according to the expiration time formula defined for the rule of the expired message type and updates the entry in the message extraction repository. Finally the MSR scans the rules for all "message in queue" states in the message extraction repository for matching conditions triggered by the detected expiration of the expiration time of a "message in queue" state.

What is claimed is:

1. A method comprising:
   determining a message type of a message placed in a first message queue of a plurality of message queues;
   determining a first rule of a plurality of rules based, at least in part, on the message type and the first message queue, wherein the plurality of rules define conditions when at least one of message priority and message sequence number change for various message types and for the plurality of message queues;
   extracting content of the message based, at least in part, on a message structure definition, which is associated with the message type, and in accordance with the first rule of the plurality of rules, the first rule defined for the first message queue and the message type;
   evaluating a condition defined by the first rule to determine that the content fulfills the condition;
   calculating at least one of a new priority level and a new message sequence number for the message in accordance with a task assigned to the condition, wherein the task indicates how to calculate the new message sequence number or the new priority level; and
   communicating at least one of the new priority level and the new message sequence number for the message to a manager of the first message queue.

2. The method of claim 1 further comprising storing the content in a message extraction repository in accordance with the first rule.

3. The method of claim 1 further comprising loading the message structure definition based, at least in part, on the message type.

4. A message queuing system for dynamic message queue priority, the message queuing system comprising:
   a processor;
   a plurality of message queues; and
   a message sequence regulator operable to,
      determine a message type of a message placed in a first message queue of the plurality of message queues;
      determine a first rule of a plurality of rules based, at least in part, on the message type and the first message queue, wherein the plurality of rules define conditions when at least one of message priority and message sequence number change for various message types and for the plurality of message queues;
      extract content of the message based, at least in part, on a message structure definition, which is associated with the message type, and in accordance with the first rule of the plurality of rules, the first rule defined for the first message queue and the message type;
      evaluate a condition defined by the first rule to determine that the content fulfills the condition;
      calculate at least one of a new priority level and a new message sequence number for the message in accordance with a task assigned to the condition, wherein the task indicates how to calculate the new message sequence number or the new priority level; and
      communicate at least one of the new priority level and the new message sequence number for the message to a manager of the first message queue.

5. The message queuing system of claim 4, wherein the message sequence regulator is further operable to load the message structure definition based, at least in part, on the message type.

6. The message queuing system of claim 4, wherein the message sequence regulator is further operable to store the content in a message extraction repository in accordance with the first rule.

7. A non-transitory computer readable medium having computer usable program code embodied therewith, the computer usable program code for dynamic message queue priority, the computer usable program code configured to:
   determine a message type of a message placed in a first message queue of a plurality of message queues;
   extract content of the message based, at least in part, on a message structure definition, which is associated with the message type, and in accordance with a first rule of a plurality of rules, the first rule defined for the first message queue and the message type;
   evaluate a condition defined by the first rule to determine that the content fulfills the condition;
   calculate at least one of a new priority level and a new message sequence number for the message in accordance with a task assigned to the condition, wherein the task indicates how to calculate the new message sequence number or the new priority level;

communicate at least one of the new priority level and the new message sequence number for the message to a manager of the first message queue; and determine the first rule of the plurality of rules based, at least in part, on the message type and the first message queue, wherein the plurality of rules define conditions when at least one of message priority and message sequence number change for various message types and for the plurality of message queues.

8. The computer usable medium of claim 7 further comprising the computer usable program code being configured to load the message structure definition based, at least in part, on the message type.

9. The computer program product of claim 7 further comprising the computer usable program code being configured to store the content in a message extraction repository in accordance with the first rule.

\* \* \* \* \*